Sept. 16, 1952          E. S. TUPPER          2,610,490
PITCHER OR THE LIKE CONTAINER
Filed Dec. 5, 1946          2 SHEETS—SHEET 1
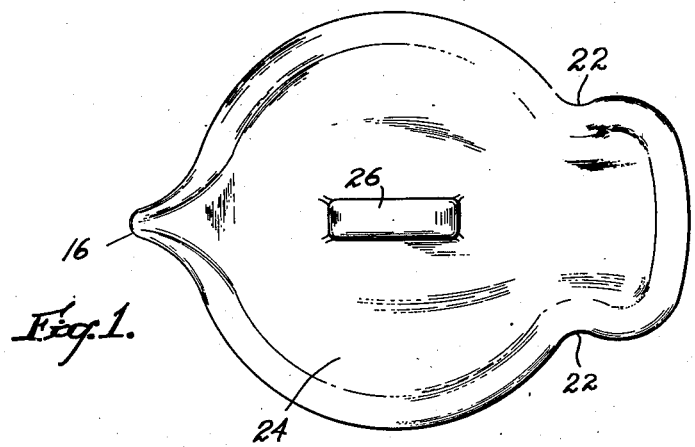
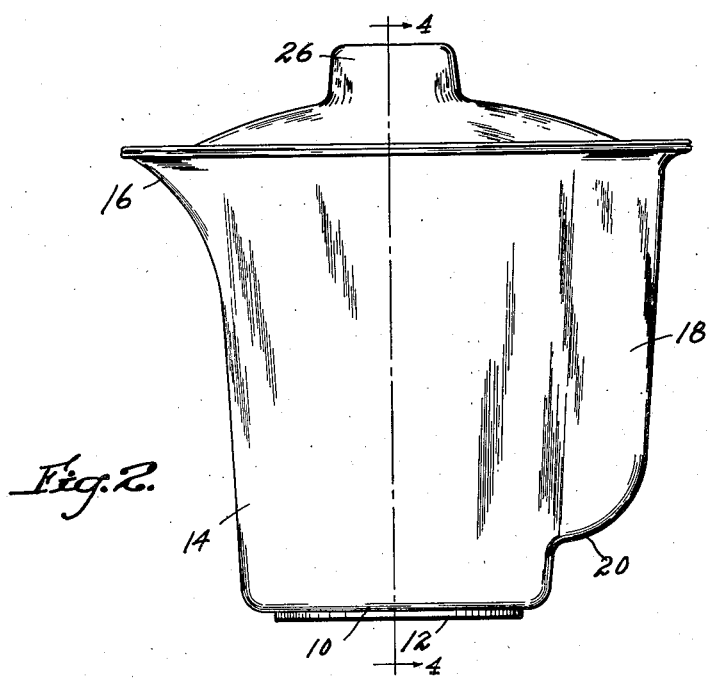
INVENTOR.
E. S. Tupper
BY Chas. R. Fay
Attorney Sept. 16, 1952    E. S. TUPPER    2,610,490
PITCHER OR THE LIKE CONTAINER Filed Dec. 5, 1946    2 SHEETS—SHEET 2

INVENTOR.
E. S. Tupper
BY Chas. R. Fay,
Attorney

Patented Sept. 16, 1952

2,610,490

UNITED STATES PATENT OFFICE 2,610,490

PITCHER OR THE LIKE CONTAINER

Earl S. Tupper, Upton, Mass.

Application December 5, 1946, Serial No. 714,238

2 Claims. (Cl. 65—31)

This invention relates to a pitcher or the like container molded of plastic material in either substantially rigid or flexible form.

Objects of the invention include the provision of a container having an integral bottom and continuous side walls, one or more of said side walls extending outwardly from the general conformation of the container to form a hollow handle freely communicating with the container throughout the length of the handle so as to enlarge the capacity of the container and taking advantage of the handle for this purpose; the provision of a container as above stated wherein the handle provides an attractive and extensive gripping portion for carrying the container or pouring the contents therefrom, and in the case of a flexible container, the handle is slightly deformable when grasped to provide a frictional nonslipping grip; and the provision of a container as above stated which in flexible form is easily squeezed to varying shapes for storage in a crowded refrigerator or deep freeze unit.

Other objects of the invention include the provision of a container as above described which is non-breakable and includes a one piece cover shaped to close both the container and the handle at the same time.

Other objects and advantages of the invention will appear hereinafter.

Reference is to be had to the accompanying drawings, in which

Fig. 1 is a top plan view showing the container with the cover in place;

Fig. 2 is a view in side elevation;

Figure 3:
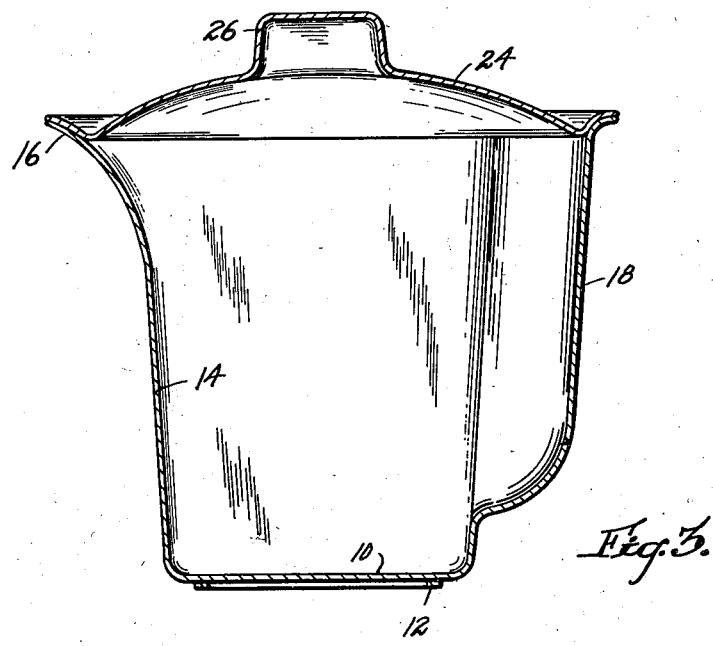
Fig. 3 is a vertical section through the container and cover.
Figure 4:
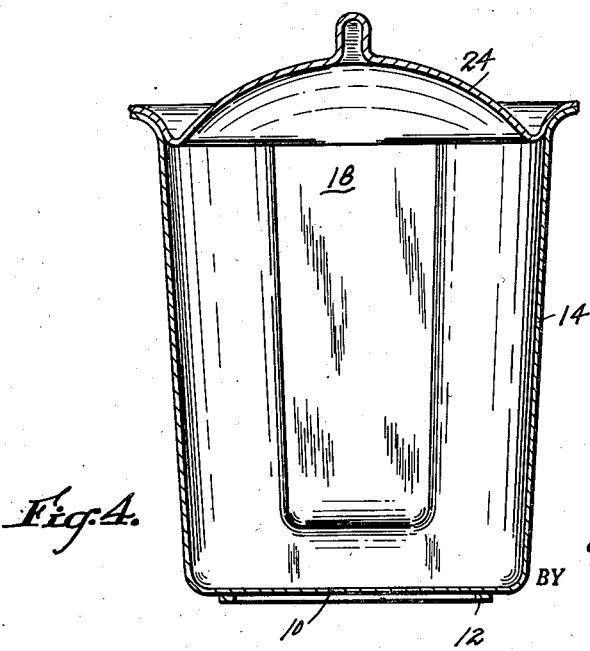
Fig. 4 is a section on line 4—4 of Fig. 2.

The present invention has been illustrated in the drawings as directed to a pitcher having a cover, but it is to be understood that other forms of the invention come within the scope thereof, such as i. e. a container having more than one handle. The present invention contemplates that the container is made of molded plastic either rigid or flexible.

The container and the cover are each molded in one piece and the container comprises a bottom portion 10 which is substantially flat and is provided with a ridge 12 for better stability. As shown in the drawings there is a side wall 14 which extends upwardly from the bottom 10 and on one portion of the side wall there is provided a pouring spout 16.

Opposite from the pouring spout 16, wall 14 extends outwardly forming a handle generally indicated at 18. This handle terminates short of the bottom as shown at 20 but the upper edge of the container is co-extensive therewith, and the handle, being a part of the side wall, forms an enlargement of the container increasing the capacity thereof. The handle may be indented as indicated at 22 in Fig. 1 to provide a better grasp for the hand, and in cases where a flexible material is used the handle will be deformed slightly when it is grasped and will thus provide a frictional non-slip grip.

A cover generally indicated at 24 is provided, this cover having a rim of a shape as shown in Fig. 1 co-extensive with the open top of the handle, the entire container, and the spout, so that with a single cover the entire container is closed. The cover is provided with a handle 26.

It will be seen from the above that this invention provides an easily molded, inexpensive container having a handle which is utilized to increase the capacity of the container and being made of plastic the same as unbreakable. When a flexible plastic material is used the container may be filled and set in a refrigerator or deep freeze unit and is easily deformable to fit crowded conditions.

Having thus described my invention and the advantages thereof, I do not wish to be limited to the details herein disclosed, otherwise than is set forth in the claims, but what I claim is:

1. A one piece flexible pitcher of distortable material having an open top and a closed bottom, a relatively high and substantially cylindrically-shaped side wall forming the body of the pitcher, a spout and a straight substantially tubularly formed handle having an open top and a closed bottom, the said spout and handle being diametrically opposite each other at the upper edge of the said side wall, the said handle projecting from the side wall and extending from a point above the bottom up to the top of the side wall and being parallel with said side wall, the outer surface of the handle being continuous from the sides with the said side wall of the body, the upper edge of the side wall, spout and handle being continuous and in the same horizontal plane, the said handle, side wall and spout being resilient whereby upon application of pressure to the handle, a non-slip grip is obtained without an appreciable distortion of the said spout.

2. In combination, a pitcher and cover therefor, the pitcher being of distortable material and having an open top and a closed bottom, a relatively high and substantially cylindrically-shaped side wall forming the body of the pitcher, a spout and a straight substantially tubularly formed handle having an open top and a closed bottom, the said spout and handle being diametrically opposite each other at the upper edge of the said side wall, the said handle projecting from the side wall and extending from a point above the bottom up to the top of the side wall and being parallel with said side wall, the outer surface of the handle being continuous from the sides with the said side wall of the body, the upper edge of the side wall, spout and handle being continuous and in the same horizontal plane and having an upwardly and outwardly curved flange thereon, the said handle, side wall and spout being resilient whereby upon application of pressure to the handle, a non-slip grip is obtained without an appreciable distortion of the said spout, the cover having a corresponding upwardly and outwardly curved flange for engagement with the first mentioned flange to cover the body of the pitcher, the open top of the handle and the open top of the spout.

EARL S. TUPPER.

REFERENCES CITED

The following references are of record in the file of this patent:

UNITED STATES PATENTS

| Number | Name | Date |
|---|---|---|
| Re. 18,942 | Morris | Sept. 12, 1933 |
| D. 34,895 | McFaddin | Aug. 6, 1901 |
| D. 43,844 | Hirschfeld | Apr. 15, 1913 |
| D. 154,348 | Tupper | June 28, 1949 |
| 245,635 | Jennings | Aug. 16, 1881 |
| 525,924 | Sabin | Sept. 11, 1894 |
| 949,644 | Borgmeyer | Feb. 15, 1910 |
| 1,149,445 | Holmes | Aug. 10, 1915 |
| 1,181,162 | Pierce | May 2, 1916 |
| 1,295,616 | Seubel | Feb. 25, 1919 |
| 1,826,593 | Azamber | Oct. 6, 1931 |
| 1,882,198 | Slick | Oct. 11, 1932 |
| 2,023,470 | Hart | Dec. 10, 1935 |
| 2,259,682 | Collins | Oct. 21, 1941 |
| 2,461,703 | Spanel | Feb. 15, 1949 |

FOREIGN PATENTS

| Number | Country | Date |
|---|---|---|
| 16,571 | Great Britain | July 28, 1903 |
| 782,971 | France | Mar. 25, 1935 |